(12) United States Patent
Hamburg

(10) Patent No.: US 7,864,200 B1
(45) Date of Patent: *Jan. 4, 2011

(54) MULTIPLE BACKDROP COMPOSITING

(75) Inventor: Mark Hamburg, Scotts Valley, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/418,211

(22) Filed: Apr. 3, 2009

Related U.S. Application Data

(63) Continuation of application No. 11/280,922, filed on Nov. 15, 2005, now Pat. No. 7,545,390, which is a continuation of application No. 09/573,075, filed on May 16, 2000, now Pat. No. 7,042,467.

(51) Int. Cl.
*G09G 5/00* (2006.01)
*G09G 5/02* (2006.01)
(52) U.S. Cl. ............... 345/629; 345/626; 345/589
(58) Field of Classification Search ............. 345/629, 345/589, 626
See application file for complete search history.

(56) References Cited

U.S. PATENT DOCUMENTS

| | | | |
|---|---|---|---|
| 5,745,121 A | 4/1998 | Politis | |
| 5,974,198 A | 10/1999 | Hamburg et al. | |
| 6,014,147 A | 1/2000 | Politis et al. | |
| 6,028,583 A | 2/2000 | Hamburg | |
| 6,185,342 B1 | 2/2001 | Hamburg et al. | |
| 6,369,830 B1 | 4/2002 | Brunner et al. | |
| 7,042,467 B1 | 5/2006 | Hamburg | |
| 7,088,375 B1 | 8/2006 | Hamburg | |
| 7,545,390 B2 * | 6/2009 | Hamburg | 345/629 |

OTHER PUBLICATIONS

Adobe Illustrator User Guide version 9.0, © 2000, Adobe Systems Incorporated, San Jose, CA, pp. 226-227.
Mulder, et al., "Pixel Masks for Screen-Door Transparency", Visualization '98. Proceedings, 1998, pp. 351-358, 550.
"Scalable Vector Graphics (SVG) 1.0 Specification," Ch. 15 (Filter Effects), W3C Working Draft Mar. 3, 2000, pp. 1-464.

* cited by examiner

*Primary Examiner*—Ryan R Yang
(74) *Attorney, Agent, or Firm*—Fish & Richardson P.C.

(57) ABSTRACT

Systems and apparatus, including computer program products, implementing techniques for compositing a digital image. The invention performs the steps of identifying a graphics element in a compositing order, the graphics element identifying a source image from among a plurality of images; copying the source image into a working buffer; using the element to modify the working buffer by applying a general filtering operation to data in the working buffer; and crossfading a first image with the modified working buffer.

32 Claims, 2 Drawing Sheets

MULTIPLE BACKDROP COMPOSITING

CROSS-REFERENCE TO RELATED APPLICATIONS

This application is a continuation application of, and claims priority to, commonly-owned U.S. patent application Ser. No. 11/280,922, entitled Multiple Backdrop Compositing, filed on Nov. 15, 2005, which is a continuation application of U.S. Pat. No. 7,042,467, entitled Compositing Using Multiple Backdrops, filed on May 16, 2000. The disclosures of the above applications are incorporated here by reference in their entirety.

BACKGROUND

The invention relates to techniques for creating digital images by compositing graphics elements.

A digital image is generally defined by color and alpha information. The alpha is optional. The color may be defined in any of a variety of color spaces, including a monochrome grayscale space. The image definition may be in a raster format, a vector format, or a combination of them.

In a digital graphics processing computer program, the traditional compositing loop has the following conceptual structure:
1. Initialize an accumulation buffer.
2. For each element to be composited in order, use the element to modify the accumulation buffer.

This loop-based model corresponds closely to a layered compositing model. Other compositing models are based on trees or directed-acyclic graphs of compositing operators that combine a collection of leaf images to produce a final image. Such non-linear models are very different in their presentation to the user and the present invention is not relevant to them. In layered compositing, an element can be an object, a layer, or a group of layers or objects or both. A description of layered compositing can be found, for example, in commonly-owned U.S. Pat. No. 6,028,583.

The invention involves a reformulation of what happens when a compositing loop uses an element to modify the accumulation buffer. Every graphics program based on a layered compositing model must define how elements modify the accumulation buffer, but such definitions have been somewhat ad hoc. Examples include blending individual layers; blending a group by making a copy of the accumulation buffer, blending the grouped layers into the copy, and then using the masks for the group to crossfade the result into the accumulation buffer; blending clipping groups; and applying color adjustments by using adjustment layers.

SUMMARY

In general, in one aspect, the invention features a method, system and apparatus, including a computer program product, implementing techniques for compositing a digital image. The techniques include providing a current accumulation image; identifying as the current element of the digital image to be processed a graphics element having a backdrop property, the backdrop property identifying a backdrop image into which the element is to be blended; using the element and the backdrop image to create a modified backdrop image; obtaining a shape mask for the element; and crossfading the current accumulation image with the modified backdrop image using the shape mask. The result of the crossfading becomes the current accumulation image for any further compositing.

Embodiments may include one or more of the following features.

The current accumulation image may be stored in a current accumulation buffer. The backdrop image may be identified by identifying a backdrop buffer or the current accumulation buffer. The backdrop image may be copied to a working buffer and the modified backdrop image may be created by using the element to modify the copy of the backdrop image in the working buffer. The result of the crossfading may be stored in the current accumulation buffer. A backdrop update element may be identified as the current element of the digital image to be processed. The update element may designate an update operation to be performed on a backdrop buffer. The update operation designated by the update element may be performed.

The update operation may copy the current accumulation buffer to the backdrop buffer. The update operation may be a stack operation. Multiple backdrop buffers may be provided. The update element and the graphics element may each have a control designating which of the multiple backdrop buffers is to be used in processing the element.

The backdrop image and the modified backdrop image may each include both color and alpha information. The element may be a layer or a group of layers. The element may have a knockout property specifying that where the element overlaps older elements or parts, the newer elements or parts just replace the older elements or parts rather than blending with them.

In another aspect, the invention features a method, system, and apparatus, including a computer program product, implementing techniques for compositing a stack of graphics elements. The techniques include initializing an accumulation buffer and one or more backdrop buffers; then, processing the stack through a compositing loop of actions. The actions include processing each element in the stack that is to be blended into the accumulation buffer by copying a designated one of the accumulation or backdrop buffers to a working buffer. The designation is defined by the current element. The techniques include using the current element to modify the working buffer; obtaining a shape mask for the element; and crossfading the accumulation buffer with the working buffer using the shape mask. The result of the crossfading is stored in the accumulation buffer.

Embodiments may include one or more of the following.

For each current element that updates a particular backdrop buffer, the actions may include using the current contents of the accumulation buffer to update the particular backdrop buffer.

Advantages that can be seen in implementations of the invention include one or more of the following. With the invention, a program can composite multiple spatially varying elements into a shared backdrop in a way that they do not interact with each other, or have limited interaction with each other, and that allows the interaction to be controlled element by element.

DESCRIPTION OF DRAWINGS

Like reference symbols in the various drawings indicate like elements.

DETAILED DESCRIPTION

Figure 1:
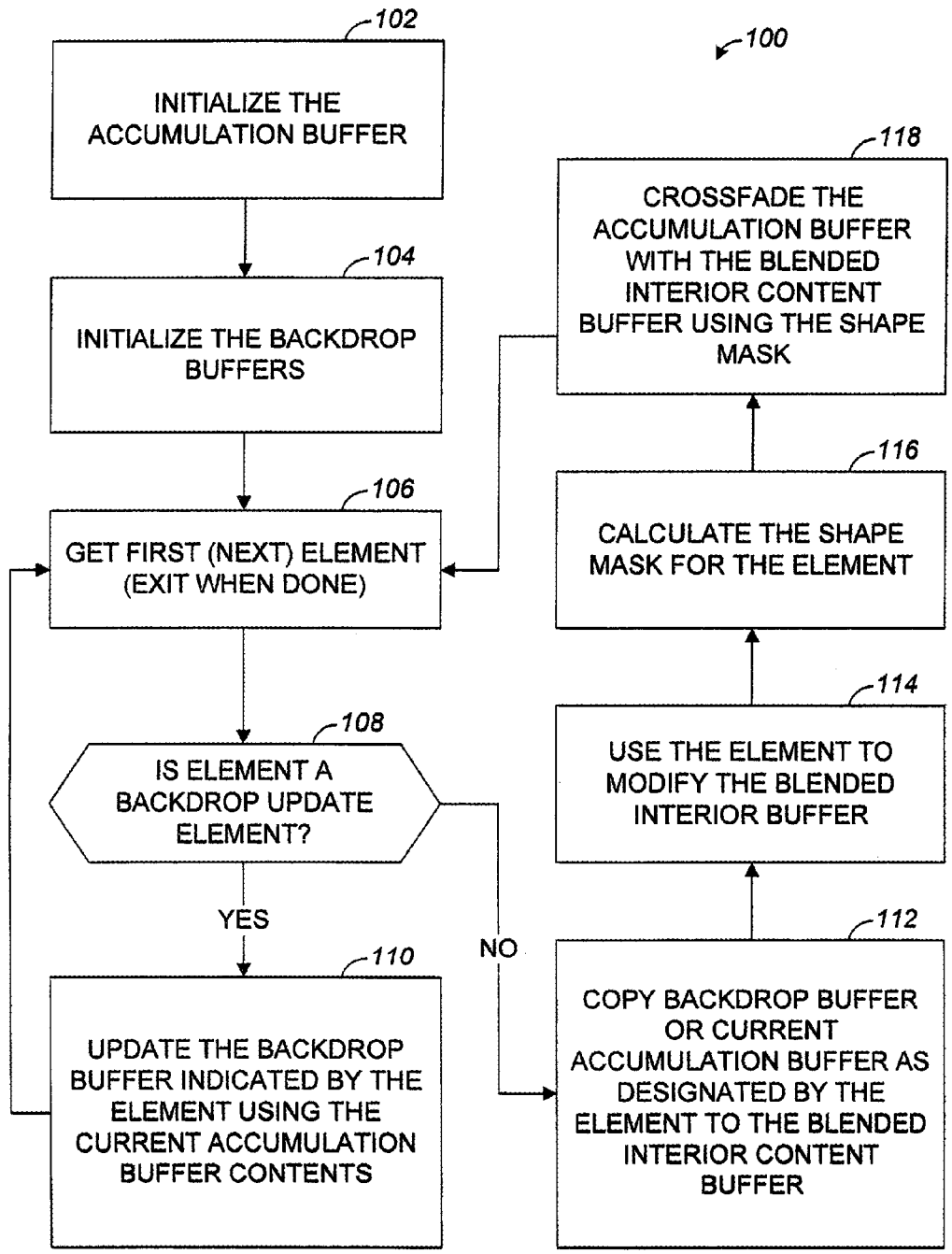
FIG. 1 is a flowchart of a generalized compositing loop in accordance with the invention.

This disclosure will describe the features and uses of a generalized compositing loop that includes the application of a shape mask.

The alpha values of a graphics element can be broken into an opacity component and a shape component, both of which can vary spatially. The opacity component determines how the element blends while the shape portion determines where it blends. Alpha is the product of the shape and the opacity components. The shape component can be treated as defining a shape mask in terms of specially identified, positionally varying scalar values. Although shape masks frequently have hard edges, meaning that at any location their value is either 0% or 100%, indicating that the location is outside or inside the element, respectively, a shape mask can have intermediate values between 0% and 100%.

A generalized two-alpha blending operation has been defined as follows for a blend between an initial accumulation buffer and an element:

$$\begin{aligned}\text{result} = \text{XFade} (\ &\text{initial},\\ &\text{XFade} (\ <\text{element.color}, 1>,\\ &\qquad <\text{Blend (initial. color, element. color)}, 1>,\\ &\qquad \text{initial.alpha}),\\ &\text{element. alpha})\end{aligned} \quad \text{(Eq. 1)}$$

The element. alpha indicates where the element exists spatially. This is described more fully in U.S. Pat. No. 6,421,460, the disclosures of which are incorporated here by reference. The Blend function in Equation 1 blends two colors in accordance with a transfer mode for color blending.

The crossfade operation XFade (<X, x>, <Y, y>, z)=<R, r> is an operation satisfying the formulas $r = \text{InterpolateAlpha}(x, y, z),$ $t = y \ast z/r,$ and $R = \text{InterpolateColor}(X, Y, t).$ Generally, the InterpolateAlpha function is a linear interpolation function yielding $r = x \ast (1-z) + y \ast z$ and the InterpolateColor function is a linear interpolation function yielding $R = X \ast (1-t) + Y \ast t.$ The X, Y, and R are generally vectors of colorant values, such as vectors of RGB or CMYK values; x, y, z, and r are alpha values; and * is a scalar multiplication operator. When used in the above equations, color and alpha values are normalized to range from zero to one, inclusive.

If the element alpha values are broken into an opacity component and a shape component, one can express Equation 1, above, as:

$$\begin{aligned}\text{result} = \text{XFade} (\ &\text{initial},\\ &\text{XFade} (\ \text{initial},\\ &\qquad \text{XFade} (\ <\text{element.color}, 1>,\\ &\qquad\qquad <\text{Blend ( initial.color, element.color)}, 1>,\\ &\qquad\qquad \text{initial.alpha}),\\ &\qquad \text{element.opacity}),\\ &\text{element.shape})\end{aligned}$$

This follows from the observation that XFade (A, B, t*u)= XFade (A, XFade (A, B, t), u).

This decomposition can be used to refine the compositing loop by defining an implementation of "use the element to modify the accumulation buffer" as follows:

1. Determine a blended interior content for the element. (The blended interior content includes color information and opacity information if opacity is being accumulated but not any shape information. That is, blended interior content describes the compositing results inside the shape.) This step generally involves a calculation, but it may involve no more than copying or identifying the content.
2. Determine a shape mask for the element.
3. Crossfade the initial accumulation buffer with the blended interior content using the shape mask.

In performing the above three steps, using the color data for an element as its content and the alpha data as its shape mask results in the traditional normal mode, Porter-Duff OVER style compositing. (See, T. Porter and T. Duff, "Compositing Digital Images", SIGGRAPH 84, pp. 253-59 (1984).)

Calculation of the blended interior content may or may not depend on the existing accumulation buffer values, so to cover the general case, the refinement can be expanded into the four steps shown below:

1a. Copy the accumulation buffer into a blended interior content buffer.
1b. Use the element to modify the blended interior content buffer.
2. Determine a shape mask for the element.
3. Crossfade the accumulation buffer with the blended interior content buffer using the shape mask.

In blending operations where the blended interior content buffer is simply overwritten with the element color, step 1a is unnecessary; and program optimization can eliminate it.

The foregoing steps 1a, 1b, 2, and 3 define a general process for "using the element to modify the accumulation" that allows a graphics program to perform an essentially arbitrary action at step 1b, but puts the arbitrary action in the context of modifying a buffer that will be crossfaded into the accumulation using a shape mask. Examples of the kinds of actions that can be performed at step 1b include:

blending the color data for a layer with the blended interior content buffer using the mode and opacity of the layer;

applying a color adjustment to the color data in the blended interior content buffer;

applying a general filtering operation to the data in the blended interior content buffer—e.g., a blurring filter; and blending the constituent elements of a group into the blended interior content buffer.

The shape mask can be determined—i.e., calculated, derived, or otherwise obtained—in a variety of ways. For example, the shape mask can be derived from the element alone or defined as being some mask in the element. It can be calculated using the element, the accumulation buffer, the blended interior content buffer, or any combination of them. Examples of deriving the shape mask from the element itself include using the combination of one or more masks in the element to compute an effective shape mask. Examples of computing the shape mask from other data include using the color of values in the accumulation buffer to determine which areas are eligible for blending.

As shown in FIG. 1, a generalized compositing loop 100 initializes the blended interior content buffer using arbitrary previous accumulation states. In fact, arbitrary images can be used, but that effect can be achieved by (i) compositing the arbitrary images with the accumulation in such a way that they block out everything and then (ii) restoring the underlying data.

Because the initial contents for the blended interior content buffer essentially serve as a backdrop for blending, this specification will refer to having multiple potential initial states as having multiple backdrops. Backdrops are copies of the accumulation created at various points in the compositing process. In the implementation being described, the copies are made from the current accumulation buffer into a backdrop buffer, of which there may be more than one. Backdrop buffers are modified when special elements are processed by the compositing loop; these elements will be referred to as backdrop update elements.

Thus, the following actions are performed by an implementation of the generalized compositing loop 100:

1. Initialize the accumulation buffer (step 102).
2. Initialize the backdrop buffers (step 104).
3. For each element, taken in a compositing order (step 106):
    3a. If the element is a backdrop update element ("yes" branch of decision step 108),
        Update the backdrop buffer or buffers indicated by the element using the current accumulation buffer contents, generally by copying (step 110);
    3b. Else (i.e., if the element is not a backdrop update element) ("no" branch of decision step 108),
        Copy the appropriate backdrop buffer or the current accumulation buffer as designated by the element to the blended interior content buffer (step 112);
        Use the element to modify the blended interior content buffer (step 114);
        Calculate the shape mask for the element (step 116); and
        Crossfade the accumulation buffer with the blended interior content buffer using the shape mask, leaving the result in the accumulation buffer (step 118).

If multiple backdrop buffers are supported, which backdrop buffer is selected for copying (in step 112) can be selected by the element, for example by a control defined through user interaction with the graphics program. Similarly, a control can select whether a backdrop buffer or the current accumulation buffer is to be copied to the blended interior content buffer in that step.

The process of updating a backdrop buffer in its simplest form involves copying the accumulation buffer to the backdrop buffer. In more sophisticated implementations, one can have backdrop buffers defining a stack of images. In this case, updating the backdrop buffer can include pushing the contents of the accumulation buffer onto the stack, popping the top element from the stack, or replacing the top element of the stack with the contents of the accumulation buffer.

The decision when to copy and where to copy the accumulation and the decision as to which buffer to use as the backdrop for an element can be user designated, or they can be derived by the system from structural properties of the elements, or both. User designation can be implemented by giving a user of the graphics program the ability to define and place an update element in an image compositing stack and the ability to define a control selecting a backdrop buffer or the current accumulation buffer as the source to be copied into the blended interior content buffer (in step 112). An update element can be represented in the user interface as a copy-to-backdrop layer, for example, and uses of the corresponding backdrop buffer can be represented by a reference to the copy-to-backdrop layer. Alternatively, or in addition, the program can be implemented to cause backdrop buffer updates and references to occur automatically to create the effects required by the structure and effects of the image being composited.

The shape mask determination can be defined to depend on the element, the blended interior content buffer, the accumulation buffer, any of the backdrop buffers, or a combination of these. In addition, when computing the blended interior content buffer, one can use the accumulation buffer in addition to the designated backdrop buffer.

Among the advantages of the generalized compositing loop 100 is that it enables a program to implement and a user to create knockout effects easily. In a knockout effect, an element punches through its immediately underlying elements to blend with an earlier state of the accumulation. Using the features of the generalized compositing loop 100 to create knockout effects has the advantage that the implementation is localized in the sense that it alters the behavior of the basic compositing loop rather than forcing individual elements to account for knockout group effects.

A user can create a knockout effect by explicitly defining the controls and update elements required to create the effect. However, providing access to these features may be confusing to users, and a simpler user interface can be implemented as follows. The user interface allows a user to identify an element of an image as a knockout element and to specify one of three generic levels to use as the backdrop. One choice is "none", which blends the element with the current accumulation for the group in which the element is found. The other two are "shallow", which uses the closest natural place to stop as backdrop, and "deep", which uses the last available place to stop as backdrop. The implementation will also stop a knockout where necessary to avoid nonsensical effects.

Figure 2:
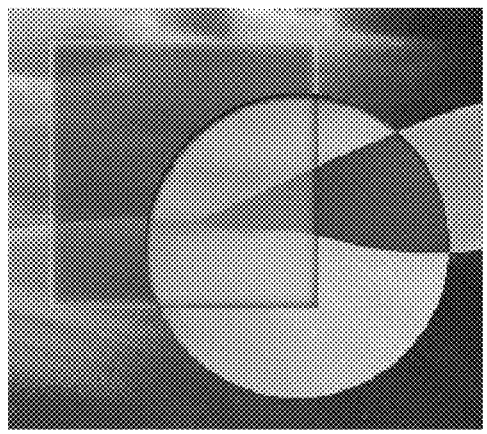
FIG. 2 is a rendered image showing traditional compositing.
Figure 3:
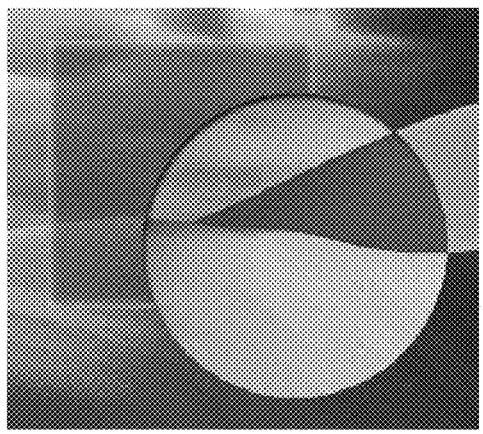
FIG. 3 is a rendered image showing compositing in accordance with the invention.

FIGS. 2 and 3 provide an example of a knockout effect. Each figure shows a composited image of three elements: a background image, a partially opaque square with a glowing edge, and a circle with an inner shadow that inverts its interior. FIG. 2 shows the image rendered with a traditional compositing approach. FIG. 3 shows the image rendered with the circle set to use the state of the accumulation underneath the square as its backdrop. Note that in the second image, the circle punches through the square to invert just the underlying data.

The invention can be used to build images having a series of 'filter layers', each of which filtered the same original image, by having a backdrop update element in the image stack copy the original image to a backdrop buffer for use by later-composited elements that define the filter layers. If elements can accept multiple backdrop inputs, an element can be defined that filters the original image and then perform a color blend with the current accumulation. Again, such an element can be defined as a layer through a user interface.

A further implementation provides a user interface through which a user can establish a series of nested groups of elements, where each group establishes a new background, and where the individual elements specify how many levels up the grouping hierarchy to look for a background.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices;

magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular implementations and uses. Other implementations and uses are within the scope of the following claims. For example, the steps of the invention can be performed in a different order and still achieve desirable results. Elements can be defined to use multiple backdrops. Optimization can be implemented to eliminate unnecessary steps. A program can infer when backdrop updates should occur from the structure of the image being composited. A program can infer which backdrops should be selected from the structure of the image being composited. Rather than being executed on the definition of an image directly, the compositing loop can be used to generate nodes in a graph of the operations to be performed to generate the final image, which graph can be optimized. A graph derived from the compositing loop and the definition of an image can be processed serially or, on appropriate computing platform, processed in parallel.

What is claimed:

1. A computer program product tangibly embodied in a computer-readable storage device and comprising computer executable instructions operable to cause a programmable processor to perform operations comprising:
    identifying a graphics element in a compositing order, the graphics element identifying a source image from among a plurality of images;
    copying the source image into a working buffer;
    using the element to modify the working buffer by applying a general filtering operation to data in the working buffer; and
    crossfading a first image with the modified working buffer.

2. The product of claim 1, wherein the first image is an accumulation image.

3. The product of claim 2, wherein the plurality of images comprises the accumulation image.

4. The product of claim 1, wherein using the element to modify the working buffer comprises:
    blending the color data for a layer with the working buffer using the mode and opacity of the layer.

5. The product of claim 1, wherein using the element to modify the working buffer comprises:
    applying a color adjustment to the color data in the working buffer; and
    blending the constituent elements of a group into the working buffer.

6. The product of claim 1, wherein the filtering operation is a blurring operation.

7. A method comprising:
    identifying a graphics element in a compositing order, the graphics element identifying a source image from among a plurality of images;
    copying the source image into a working buffer;
    using the element to modify the working buffer by applying a general filtering operation to data in the working buffer; and
    crossfading a first image with the modified working buffer.

8. The method of claim 7, wherein the first image is an accumulation image.

9. The method of claim 8, wherein the plurality of images comprises the accumulation image.

10. The method of claim 7 wherein using the element to modify the working buffer comprises:
    blending the color data for a layer with the working buffer using the mode and opacity of the layer.

11. The method of claim 7, wherein using the element to modify the working buffer comprises:
    applying a color adjustment to the color data in the working buffer; and
    blending the constituent elements of a group into the working buffer.

12. The method of claim 7, wherein the filtering operation is a blurring operation.

13. A system comprising:
    a display device;
    machine-readable storage device including a program product; and
    one or more processors operable to execute the program product, interact with the display device, and perform operations comprising:
        identifying a graphics element in a compositing order, the graphics element identifying a source image from among a plurality of images;
        copying the source image into a working buffer;
        using the element to modify the working buffer by applying a general filtering operation to data in the working buffer; and
        crossfading a first image with the modified working buffer.

14. The system of claim 13, wherein the first image is an accumulation image.

15. The system of claim 14, wherein the plurality of images comprises the accumulation image.

16. The system of claim 13, wherein using the element to modify the working buffer comprises:
    blending the color data for a layer with the working buffer using the mode and opacity of the layer.

17. The system of claim 13, wherein using the element to modify the working buffer comprises:
    applying a color adjustment to the color data in the working buffer; and
    blending the constituent elements of a group into the working buffer.

18. The system of claim 13, wherein the filtering operation is a blurring operation.

19. A system for compositing a digital image, comprising:
a display device;
machine-readable storage device including a program product; and
one or more processors operable to execute the program product, interact with the display device, and perform operations comprising:
providing a current accumulation image;
identifying as the current element of the digital image to be processed a graphics element having a backdrop property, the backdrop property identifying one of a plurality of backdrop images into which the element is to be blended;
blending the element into the identified backdrop image to create a modified backdrop image;
obtaining a shape mask for the element; and
crossfading the current accumulation image with the modified backdrop image using the shape mask, the result of the crossfading becoming the current accumulation image for any further compositing.

20. The system of claim 19, wherein:
the current accumulation image is stored in a current accumulation buffer;
the backdrop image is identified by designating one of a backdrop buffer and the current accumulation buffer;
the backdrop image is copied to a working buffer and the modified backdrop image is created by using the element to modify the copy of the backdrop image in the working buffer; and
the result of the crossfading is stored in the current accumulation buffer.

21. The system of claim 20, wherein the operations further comprise:
identifying as the current element of the digital image to be processed a backdrop update element, the update element designating an update operation to be performed on a backdrop buffer; and
performing the update operation designated by the update element.

22. The system of claim 21, wherein:
the update operation copies the current accumulation buffer to the backdrop buffer.

23. The system of claim 21, wherein:
the update operation is a stack operation.

24. The system of claim 21, wherein the operations further comprise providing multiple backdrop buffers, wherein:
the update element and the graphics element each have a control designating which of the multiple backdrop buffers is to be used in processing the element.

25. The system of claim 19, wherein:
the backdrop image and the modified backdrop image each include both color and alpha information.

26. The system of claim 19, wherein:
the element is a layer or the element is a group of layers.

27. The system of claim 19, wherein:
the element further has a knockout property, the knockout property specifying that where the element overlaps older elements or parts, the newer elements or parts just replace the older elements or parts rather than blending with them.

28. A system for compositing a stack of graphics elements, comprising: a display device;
machine-readable storage device including a program product; and
one or more processors operable to execute the program product, interact with the display device, and perform operations comprising:
initializing an accumulation buffer and one or more backdrop buffers; and then, processing the stack through a compositing loop of actions, the actions comprising processing each element in the stack that is to be blended into the accumulation buffer by:
copying contents of a designated one of a plurality of buffers comprising the accumulation buffer and the one or more backdrop buffers to a working buffer, said element defining the designated buffer as one of said plurality of buffers,
using said element to modify the working buffer,
obtaining a shape mask for said element, and
crossfading contents of the accumulation buffer with contents of the working buffer using the shape mask and storing the result in the accumulation buffer.

29. The system of claim 28, the actions further comprising:
for each current element that updates a particular backdrop buffer, using the current contents of the accumulation buffer to update the particular backdrop buffer.

30. The system of claim 28, wherein at least some of the graphic elements each comprises a layer or a group of layers.

31. The system of claim 28, wherein at least some of the graphic elements each comprises a group of layers.

32. The system of claim 28, wherein the element is a group of layers.

* * * * *